Oct. 21, 1969      R. R. CHUTTER      3,473,761
PNEUMATIC TUBULAR CONSTRUCTION

Filed May 31, 1967      2 Sheets-Sheet 1

INVENTOR
RICHARD R. CHUTTER
BY

*Blair Buckles, Cesari & St.Onge*
ATTORNEYS

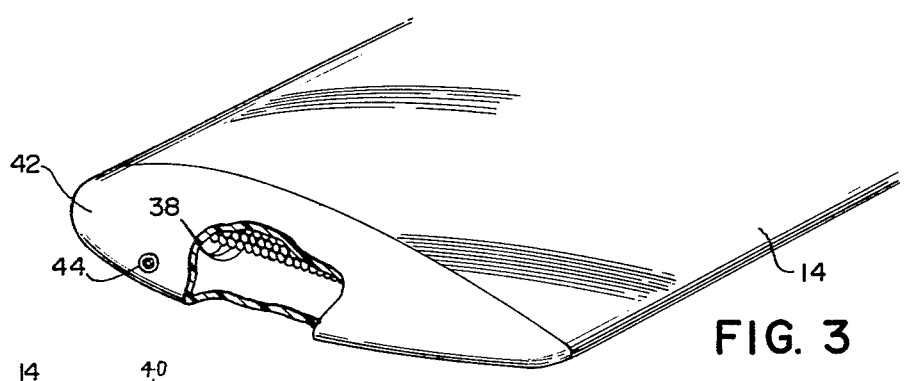
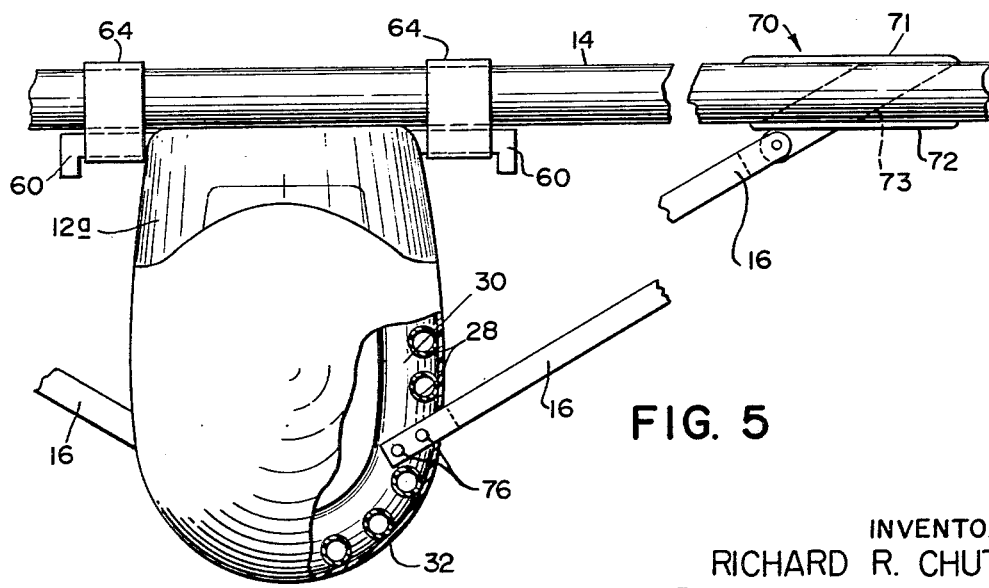

United States Patent Office 3,473,761
Patented Oct. 21, 1969

3,473,761
PNEUMATIC TUBULAR CONSTRUCTION
Richard R. Chutter, 73 Conant St.,
Beverly, Mass. 01915
Filed May 31, 1967, Ser. No. 642,591
Int. Cl. B64c 1/06
U.S. Cl. 244—119          8 Claims

ABSTRACT OF THE DISCLOSURE

A structural member for use in aircraft and the like composed of a cluster of lightweight interconnected tubes in which the tubes contain fluid under pressure to stiffen them sufficiently to make the overall cluster relatively rigid.

BACKGROUND OF THE INVENTION

Field of the invention

This invention relates to a structural member having a high strength-to-weight ratio.

The members with which we are concerned here have wide application in the manufacture of airplanes, gliders, and the like vehicles which must be relatively lightweight, yet have superior strength. For illustrative purposes, we will describe the invention with relation to the manufacture of various airfoils and airframe components. It should be understood, however, that the invention also has application in the automotive, marine and building industries where strength and weight are factors to be considered in product manufacture.

Description of the prior art

Conventional airframe components and airfoils such as wings, rudders, stabilizers and the like are hollow members composed of an underlying network of beams, frames and trusses as well as an outer skin which encloses the framing and provides a smooth, aerodynamically good surface. The internal framing of each member is relatively heavy and massive in order to give it the proper strength and rigidity. Also, the skin of each member must be relatively thick to provide sufficient surface strength. As a consequence, the framing and skin for all such components contribute in large part to the overall weight of the aircraft and reduce correspondingly the pay load which it can carry.

SUMMARY OF THE INVENTION

Accordingly, this invention aims to provide structural members for use in an aircraft or the like which are lightweight yet possess superior strength.

Another object of the invention is to provide structural members for use in aircraft and the like which can absorb sudden loads beyond failure, yet return to their neutral positions when the loads are removed.

Another object of the invention is to provide a strong, lightweight structural member which is relatively easy and inexpensive to manufacture.

A further object of this invention is to provide a structural member which is lightweight, yet relatively rigid.

Still another object of the invention is to provide a structural member which can be preformed to its ultimate shape and requires no subsequent assembly.

A further object of the invention is to provide a structural member having superior flotation characteristics.

A still further object of the invention is to provide a structural member having superior heat insulating properties.

A still further object of the invention is to provide a structural member which may be collapsed for storage in a minimum amount of space.

Another object of the invention is to provide an aircraft made of structural members having one or more of the above characteristics.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, my improved structural member is composed of a cluster of lightweight tubes which may or may not be flexible. The individual tubes in the cluster are joined to adjacent tubes to form a unitary structure having the overall shape of the structural component. A glider wing, for example, comprises a cluster of long, parallel, cemented-together or fused-together tubes with the tubes in the cluster being shaped and arranged so that the cluster has the overall configuration of the wing. The tubes are filled with fluid under pressure which stiffens them to give the overall member, i.e. the wing, the proper form and the requisite rigidity.

The tubes in the cluster may have any cross sectional design necessary to meet the load requirements. Also, their diameters are chosen so that the particular member has the best strength-to-weight ratio and the best form or outline. In addition, where necessary, the tube cluster may be provided with a suitable skin or surface to give it a smooth outer envelope.

Once the tubes have been filled with fluid, they may be sealed permanently to preserve the rigidity and form of the member. In many instances, however, it is desirable to make a structural member which is collapsible. In this event, the tubes and skin of the member are made of a flexible material. The member remains rigid as long as the tubes are filled with fluid under pressure. When the fluid is released, however, the member as a whole becomes flexible and may then be folded or collapsed.

Illustratively, members formed as aforesaid to have the shapes of a wing, fuselage, tail assembly and control surfaces respectively may be joined together to make a strong lightweight glider or the like. If desired, one or more of these members, e.g. the glider wing, may be made collapsible to facilitate storing the aircraft.

BRIEF DESCRIPTION OF THE DRAWINGS

For a fuller understanding of the nature and objects of the invention, reference should be had to the following detailed description taken in connection with the accompanying drawings, in which:

FIG. 2B is a vertical section along line 2B—2B of FIG. 1;

FIG. 2C is a similar view along line 2C—2C of FIG. 1;

FIG. 3 is a perspective view with parts cut away on a still larger scale of a portion of FIG. 1 showing a wing tip;

FIG. 5 is a fragmentary front elevational view partially broken away of a portion of FIG. 1.

DESCRIPTION OF THE PREFERRED EMBODIMENT

Figure 1:
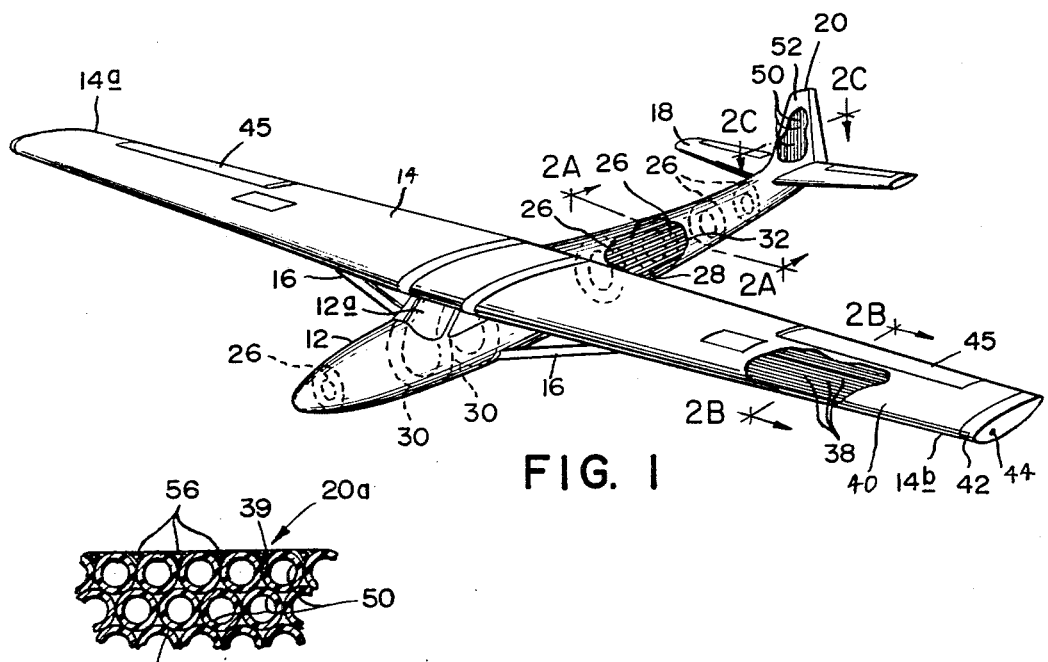
FIG. 1 is a perspective view of a glider with parts broken away made in accordance with this invention.

Referring to FIG. 1 of the drawings, the glider comprises a fuselage 12 having a wing 14 attached thereto.

A pair of struts 16 may be secured between wing 14 and fuselage 12 at opposite sides of the latter to minimize stresses at the wing-fuselage intersection. Also, a stabilizer 18 and rudder 20 are secured to the tail end of fuselage 12.

Figure 2A:
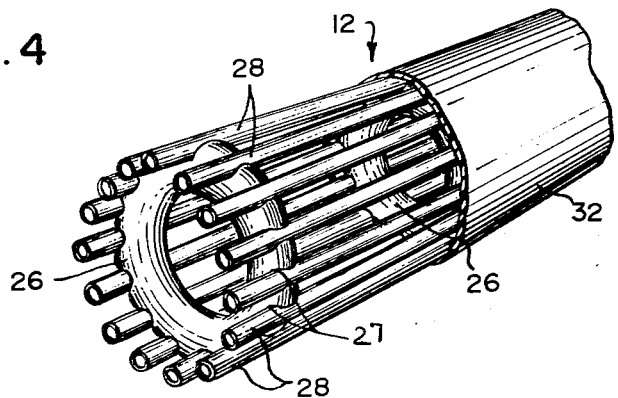
FIG. 2A is a perspective view on a larger scale along line 2A—2A of FIG. 1.

With reference now to FIGS. 1 and 2A, fuselage 12 includes a set of frame members 26 spaced along its length. Each frame member 26 consists of a circular, transverse, fluid-tight tube made of foam or any suitable rigid or flexible plastic material such as reinforced or nonreinforced polyester, vinyl polymers, or the like. If desired, these tubes may be reinforced with spirally wrapped fiberglass strands. Members 26 are filled with fluid under sufficient pressure above atmospheric to make them relatively rigid and to extend them to their full diameters. Any suitable nonflammable, relatively inexpensive gas such as air, helium or carbon dioxide may be used to pressurize the tubes.

The diameters of the various circular frame members 26 are selected as needed to give fuselage 12 the proper form as seen in FIG. 1. Also, preferably a series of notch-like openings 27 are distributed about the periphery of member 26.

An array of relatively small diameter, thin-walled tubes 28 are distributed around frame members 26. Tubes 28 fit snugly in openings 27 and extend longitudinally between members 26. Tubes 28 are made of the same materials as members 26 and they are bent as needed and their diameters are selected as needed to form the contoured fuselage seen in FIG. 1. The tubes 28 are bonded to frame members 26 by fusion, adhesion, or other suitable means.

Tubes 28 are also filled with fluid under pressure to stiffen them and their ends are closed and sealed so that the tubes form permanent relatively rigid stringers between the various frame members 26. Where openings are made into the fuselage 12 such as, for example, in the region of cockpit 12a, the ends of tubes 28 bounding these openings are also sealed so that there is no leakage of fluid at these points.

Those portions of fuselage 12 which are subjected to unusually great stresses, such as in the pilot's compartment, in the regions of the tail section and the wing fuselage intersection, are reinforced by the addition of strong, lightweight, transverse frame members 30 made of reinforced plastic foam, aluminum, magnesium or other strong lightweight material. Frame members 30 are bonded to the adjacent tubes 26. They distribute concentrated loads and also serve as connecting points for the other components of the aircraft as will be described in more detail later in connection with FIG. 5.

The cockpit 12a may comprise a single precast piece of plastic, aluminum, magnesium, or other strong, lightweight material. It is anchored by conventional means to adjacent reinforced frame members 30.

Even though the tubes 26 and 28 themselves may be relatively nonrigid, the fact that they are interconnected and pressurized makes the fuselage 12 as a whole quite rigid. Actually, fuselage 12 is stronger and more rigid than a comparable fuselage made of a single, similarly-shaped shell of the same weight.

Still referring to FIGS. 1 and 2A, an outer skin 32 is applied over tubes 28 to give fuselage 12 a smooth outer surface. Preferably, skin 32 comprises a plastic sheet or film suitably bonded to the underlying tubes 28. However, in some applications, canvas, fiberglass, nylon, or other such strong, relatively lightweight fabric may be used to sheath fuselage 12.

Figure 4:
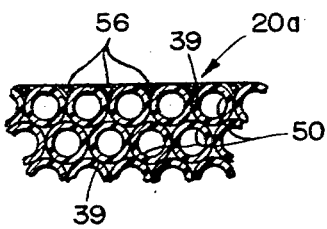
FIG. 4 is a fragmentary sectional view of a portion of FIG. 2C.

Referring now to FIGS. 1 and 2B, wing 14 comprises a closely packed cluster of relatively small diameter, parallel, fluid-tight tubes 38. The wall portions of the tubes 38 in contact with one another are bonded together by cement or fusion as best seen in FIG. 4 so that there is a common membrane 39 between them. The lengths and diameters of tubes 38 are selected to provide the illustrated wing configuration. Also, a plastic film 40 is bonded to the exposed tubes 38 in the cluster to give the wing a smooth, aerodynamically good surface.

As best seen from FIG. 1, the glider could be stored in a relatively small space but for wing 14. To avoid this disadvantage, wing 14 is constructed so that it can be collapsed and folded against fuselage 12. More particularly, and referring also to FIG. 3, tubes 38 and film 40 are made of flexible, even rather limp, materials. Also, while the ends of tubes 38 at one wing end 14a are permanently sealed, the other ends of these tubes are valved so that the tubes can be individually inflated. Alternatively, the other ends are left open and extend into a hollow manifold 42. Manifold 42, which may be made of rigid plastic, metal or the like, forms the other wing end 14b and is shaped accordingly. It overlaps the open ends of tubes 38 and is permanently bonded thereto to provide a fluid-tight enclosure. A valved fitting 44 is then provided in manifold 42 so that the tubes 38 can be filled with fluid under pressure all at once.

The control surfaces or ailerons 45 in wing 14 are also constructed of clusters of flexible tubes covered by flexible films and they are also provided with valves so that they can be pressurized just like the wing 14 proper. Ailerons 45 are connected to the wing 14 proper by hinges 46 which are flexible or articulated so that they can fold or bend when the wing 14 is folded against fuselage 12.

When the tubes in wing 14 (and in ailerons 45) are filled with fluid under pressure, the wing extends to its full length shown in FIG. 1 and becomes a strong, relatively rigid unit. The rigidity derives from the mutual support given by the closely packed pressurized tubes in the wing cluster. That is, even though each tube 38 considered singly may be relatively flexible, when they are interconnected and pressurized as described herein, the tubes collectively form a lightweight, relatively rigid, nonflexible wing structure. Also, because the tubes 38 have a small diameter, they can be individually placed under great fluid pressure. This also helps to rigidify the overall structure.

Referring now to FIGS. 1 and 2C, stabilizer 18 and rudder 20 are similarly constructed of closely packed clusters of interconnected tubes 50 suitably arranged and shaped to form these components. In the present example, stabilizer 18 and rudder 20 need not be collapsible. Therefore, tubes 50 may be made of flexible or nonflexible material. Tubes 50 are filled with fluid under pressure and their ends sealed as described above in connection with the tubes 28 in fuselage 12. Also, a plastic film 52 is bonded to the exposed tubes 50 to give the rudder and stabilizer smooth outer surfaces. The movable parts of these components are constructed and attached in much the same fashion as ailerons 45 in wing 14.

FIG. 4 illustrates a different technique for giving various glider components a smooth outer envelope. It shows a fragmented sectional view of a modified rudder 20a. Rudder 20a has the very same shape as the one shown in FIG. 2C and its construction is also the same except that it includes a set of solid or hollow filler strips 56 bonded to the outer tubes 50. Strips 56 are generally triangular in cross section and feather into tubes 50 so as to provide a smooth surface on rudder 20a. Since strips 56 may be bunched with, and fused to, tubes 50 at the time the rudder cluster is formed, this technique eliminates the need of applying the outer surface film to the already-formed tube cluster as a separate step.

The various components of the aircraft are secured together to minimize stresses at the various intersections. FIG. 5 illustrates a preferred means for attaching wing 14 to fuselage 12. A pair of L-shaped channels 60 extend out sideways from the roof of cockpit 12a. Straps 64 are engaged over wing 14 and around each bracket 60. When straps 64 are pulled taut and secured, they anchor wing 14 firmly to fuselage 12.

Struts 16 are removably connected to wing 14 by means of fixtures 70 therein. Each fixture comprises a pair of upper and lower plates 71 and 72 engaging the upper and lower surfaces of wing 14 respectively. The edges of plates 71 and 72 are feathered into the wing to present relatively smooth surfaces. Plates 71 and 72 are connected by means of one or more parallel webs 73 extending through wing 14. This large area, clamp-like construction of fixture 70 distributes stresses over a relatively large area of wing 14. The bifurcated upper end of each strut 16 is then removably connected by a bolt 74 to ear 75 depending from plate 72 of the corresponding fixture 70.

The bifurcated lower ends of struts 16 extend through film 32 on the fuselage and are secured by bolts 76 to the opposite sides of reinforced frame member 30 below cockpit 12a (FIG. 5). Bolts 74 and 76 are removed to disengage struts 16 from fuselage 12 when folding the wing as aforesaid.

Obviously, the tubes in the other glider components can be flexible like those in wing 14. These components, like wing 14, become rigid when filled with fluid under pressure. Also, the tubes in the various collapsible components can be pressurized singly or in groups using several manifolds 42 that will not permit total failure of a component should a leak develop in one tube thereof. It should be apparent also that an engine may be mounted in the nose of fuselage 12 or on wing 14 to convert the glider to a powered airplane.

Structural members made in accordance with my technique are strong and lightweight. Also, they are very buoyant due to their air-filled cellular construction. This makes them particularly suitable for making boats, canoes and the like. For the same reason, they possess superior heat insulating qualities.

While I have described the invention in connection with the construction of various aircraft components, it will be apparent from the foregoing description that the pneumatic tubular construction disclosed herein has wide application in other areas demanding structural members having a good strength-to-weight ratio.

Having described my invention, what I claim as new and desire to secure by Letters Patent is:

1. An aircraft comprising:
   (A) a fuselage (12) comprising:
      (1) a set of spaced transverse frame members (26);
      (2) a plurality of closed tubes (28)
         (a) extending longitudinally between said frame members;
         (b) secured to the edges thereof; and
         (c) filled with fluid under sufficient pressure above atmospheric to rigidify said fuselage; and
      (3) a skin (32) enclosing said plurality of tubes;
   (B) a wing (14) comprising:
      (1) a cluster of closely packed parallel closed tubes (38), the walls of said tubes being connected together where they contact each other, the dimensions of said tubes being such as to give the cluster the overall shape of said airfoil, said tubes containing fluid under sufficient pressure above atmospheric to rigidify said cluster; and
      (2) means (40) on said cluster to give it a relatively smooth surface; and
   (C) means (64) for securing said wing to said fuselage.

2. An aircraft as defined in claim 1 further including means (42, 44) for releasing said fluid from said tubes in said wing whereby said tubes become sufficiently flexible to permit folding of said wing against said fuselage.

3. An aircraft as defined in claim 2 and further including:
   (A) movable surfaces (45) comprising:
      (1) small clusters of closed pressurized tubes (38); and
      (2) hinge means (46) for connecting said movable surfaces to said wing, said hinge means being foldable along with said wing against said fuselage.

4. An aircraft as defined in claim 2 and further including:
   (A) struts (16);
   (B) means (70) for removably connecting each of said struts to said wing; and
   (C) means (73) for removably connecting each of said struts to one of said frame members.

5. An aircraft as defined in claim 4 wherein said connecting means (70) each comprise a wide plate (72) on the top surface of said wing, said plate being removably secured to the end of the corresponding strut.

6. An aircraft as defined in claim 2 wherein said releasing means comprises:
   (A) a manifold (42)
      (1) secured to the end of said wing; and
      (2) communicating with said tubes therein; and
   (B) a valve (44) in said manifold for connecting to a source of pressurized gas.

7. An aircraft as defined in claim 2 and further including:
   (A) a rudder (20); and
   (B) a stabilizer (18), said rudder and stabilizer each being:
      (1) secured to the tail end of said fuselage; and
      (2) composed of a closely-packed cluster of pressurized tubes (52).

8. An aircraft as defined in claim 2 wherein said securing means comprises straps (64)
   (A) engaging around said wing; and
   (B) secured to said fuselage.

References Cited

UNITED STATES PATENTS

| | | | |
|---|---|---|---|
| 2,968,456 | 1/1961 | Hanson | 244—123 |
| 1,667,002 | 4/1928 | Hall | 244—5 |
| 2,334,539 | 11/1943 | Buchtel | 244—119 X |
| 2,540,482 | 2/1951 | Hervey | 244—119 X |
| 2,666,602 | 1/1954 | Holland | 244—117 X |
| 3,338,203 | 9/1967 | Moore | 114—66.5 |

FOREIGN PATENTS 837,591   6/1960   Great Britain.

MILTON BUCHLER, Primary Examiner
T. W. BUCKMAN, Assistant Examiner

U.S. Cl. X.R.
244—123